US008555309B2

(12) United States Patent
Hamilton

(10) Patent No.: US 8,555,309 B2
(45) Date of Patent: Oct. 8, 2013

(54) CONVERGED COMMUNICATION SERVER WITH TRANSACTION MANAGEMENT

(75) Inventor: Chris A. Hamilton, Montclair, NJ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/206,410

(22) Filed: Aug. 9, 2011

(65) Prior Publication Data
US 2011/0296457 A1 Dec. 1, 2011

Related U.S. Application Data

(63) Continuation of application No. 10/146,760, filed on May 16, 2002, now Pat. No. 8,082,565.

(51) Int. Cl.
*H04N 7/10* (2006.01)
(52) U.S. Cl.
USPC .................... 725/34; 725/32; 725/35; 725/36
(58) Field of Classification Search
USPC ................................................ 725/32, 34–36
See application file for complete search history.

(56) References Cited

U.S. PATENT DOCUMENTS

| | | | | |
|---|---|---|---|---|
| 5,446,919 A | * | 8/1995 | Wilkins | 725/35 |
| 5,774,170 A | * | 6/1998 | Hite et al. | 725/34 |
| 6,889,385 B1 | * | 5/2005 | Rakib et al. | 725/119 |
| 7,010,801 B1 | * | 3/2006 | Jerding et al. | 725/95 |
| 7,444,659 B2 | * | 10/2008 | Lemmons | 725/34 |
| 7,634,787 B1 | * | 12/2009 | Gebhardt et al. | 725/36 |
| 2003/0139966 A1 | * | 7/2003 | Sirota et al. | 705/14 |

* cited by examiner

*Primary Examiner* — Hunter B Lonsberry
(74) *Attorney, Agent, or Firm* — Pillsbury Winthrop Shaw Pittman LLP

(57) ABSTRACT

A communications server increases the value of cable and communication services by enabling the integration of packet network content with directed advertising in a managed environment. Such services may include Video On Demand and videoconferencing running on a Converged Communication Platform. Content processing within the server enables the combining of streaming content with different types of ads. Content integration is controlled through software negotiations between subscriber, advertiser, and content provider software agents. The rate, selection, placement, and number of advertisements within a television program or videoconference can also be determined. The ability to custom tailor content and advertisements increases the value of advertising, lowers costs to subscribers, improves the viewing experience, and disburdens transaction participants from the manual tasks that would otherwise be required during transaction setup.

13 Claims, 4 Drawing Sheets

CONVERGED COMMUNICATION SERVER WITH TRANSACTION MANAGEMENT

RELATED APPLICATIONS

This application is a continuation application of application Ser. No. 10/146,760filed on May 16, 2002.

BACKGROUND OF THE INVENTION

1. Technical Field

An embodiment of the invention generally relates to communication servers. More particularly, the present invention relates to an improved communications server that enables integration of packet network content with directed advertisement in a managed environment.

2. Discussion of the Related Art

Digital streaming of communications and entertainment content is an important development in the field of network services. Communications systems that deliver content via packet networks are capable of providing a wider range of services than traditional delivery mechanisms.

In the near future, Quality of Service (QOS) capabilities will be implemented across the Internet, enabling video content providers to stream high quality video to subscribers via Internet Protocol uni-cast and multi-cast sessions. Video On Demand (VOD) will become a major consumer of network transport and processing bandwidth in the next few years. VOD services allow subscribers to select video or other media content for immediate streaming, on a per subscriber basis. Service providers will be able to tailor many services to subscribers based on characteristics such as viewing interests, occupation, etc.

Content and service providers should be rewarded for the value they provide. Advertising is one method of disburdening the end consumer, or subscriber, from bearing these costs alone. For broadcast services, such as network television, advertising allows free distribution of content to the public. However, the value of broadcast advertising is diluted by that pool of viewers to whom the ads are of no concern. Directed advertising is a means of increasing the marketing power of ads by sending specific ads to selected viewers based on individual viewer characteristics. For advertisers, a broadcast program acts as a proxy for the viewer. In the VOD model, uni-cast and multi-cast content distribution can be sponsored through directed advertising, allowing potentially fewer ads to offset the cost of content licensing and distribution.

Many types of ads may be integrated with content in VOD or telecommunication sessions. Traditional commercial interruption ads are one type of ad, as are web banner ads. Such ads may require content to be processed if the final result is to be appealing. For example, since ad duration and placement within the main program content may be arbitrary, it may be necessary to fade video programs to avoid abrupt transitions between programs and ads. Likewise, banner ads may require that content originally meant to be displayed in 4:3 aspect ratio be squeezed anamorphically into a rectangle above or below the banner rectangle.

Other forms of ads are also possible. Video and audio processing can integrate ads with content in ways that are less intrusive. Semi-transparent ads, synthetic product placement, and content-coupled ads (e.g., beer ads shown during bar scenes) are other examples.

In like fashion, communications may be sponsored by audio and video ads that are inserted advantageously within content streams. Two-way and multi-party communication sessions, including both audio and videoconferences, may be sponsored by ads to offset the costs that would otherwise fall to the session participants.

Therefore, there is a need for a converged communication server that allows specific ads to be integrated with content and be sent only to those subscribers fitting certain criteria, e.g., they drink beer. This scheme yields greater marketing value to the advertiser, which in turn can lower costs to all transaction participants.

DETAILED DESCRIPTION

The present invention is a converged communications server that creases the value of cable and communication services by enabling integration of packet network content with directed advertising in a managed environment. Such services may include Video On Demand and videoconferencing running on a converged communication platform. Content processing within the server enables the combining of streaming content with many different types of ads. Content integration is controlled through software negotiations between subscriber, advertiser, and content provider software agents. The rate, selection, placement, and number of advertisements within a program (e.g., a television program) or videoconference may also be determined. The ability to custom tailor content and advertisements in this way increases the value of advertising, lowers costs to subscribers, improves the viewing experience, and disburdens transaction participants from the manual tasks that would otherwise be required during transaction setup.

The present invention allows specific ads to be sent only to those subscribers fitting certain criteria, e.g., they drink beer. The present invention yields greater marketing value to the advertiser, which in turn can lower costs to all transaction participants.

Adjunct to such VOD and videoconference services, software agents may model the features and wishes of the transaction participants. A software agent representing a subscriber might contain a profile of viewing preferences and personal behaviors, as well as modeling other behavioral characteristics, such as content pricing goals, etc.

Other agents may also represent content providers and advertisers. Together, all participating agents may negotiate, via an algorithmic model of negotiation, to collectively optimize a transaction. An optimum transaction might be defined as that set of transaction characteristics, such as ad selections, ad types, and number of ads that result in the minimum cost and annoyance to the subscriber.

Because content providers cannot anticipate every possible combination (number of ads, length, type, screen position, etc.), content may have to be modified or processed per subscriber during streaming. The present invention combines packet network content distribution, content processing, and agent mediated transaction processing.

Content may be distributed from the content provider in various media formats, such as Moving Pictures Experts Group 4, also known as MPEG4 (Specification ISO/IEC JTC1/SC29/WG11 N4030, International Organisation for Standardisation Organisation Internationale De Normalisation; published March 2001) and MP3, a subset of MPEG1 (Specification ISO/IEC JTC1/SC29/WG11 NMPEG 96, International Organisation for Standardisation Organisation Internationale De Normalisation, published June 1996).

Figure 1:
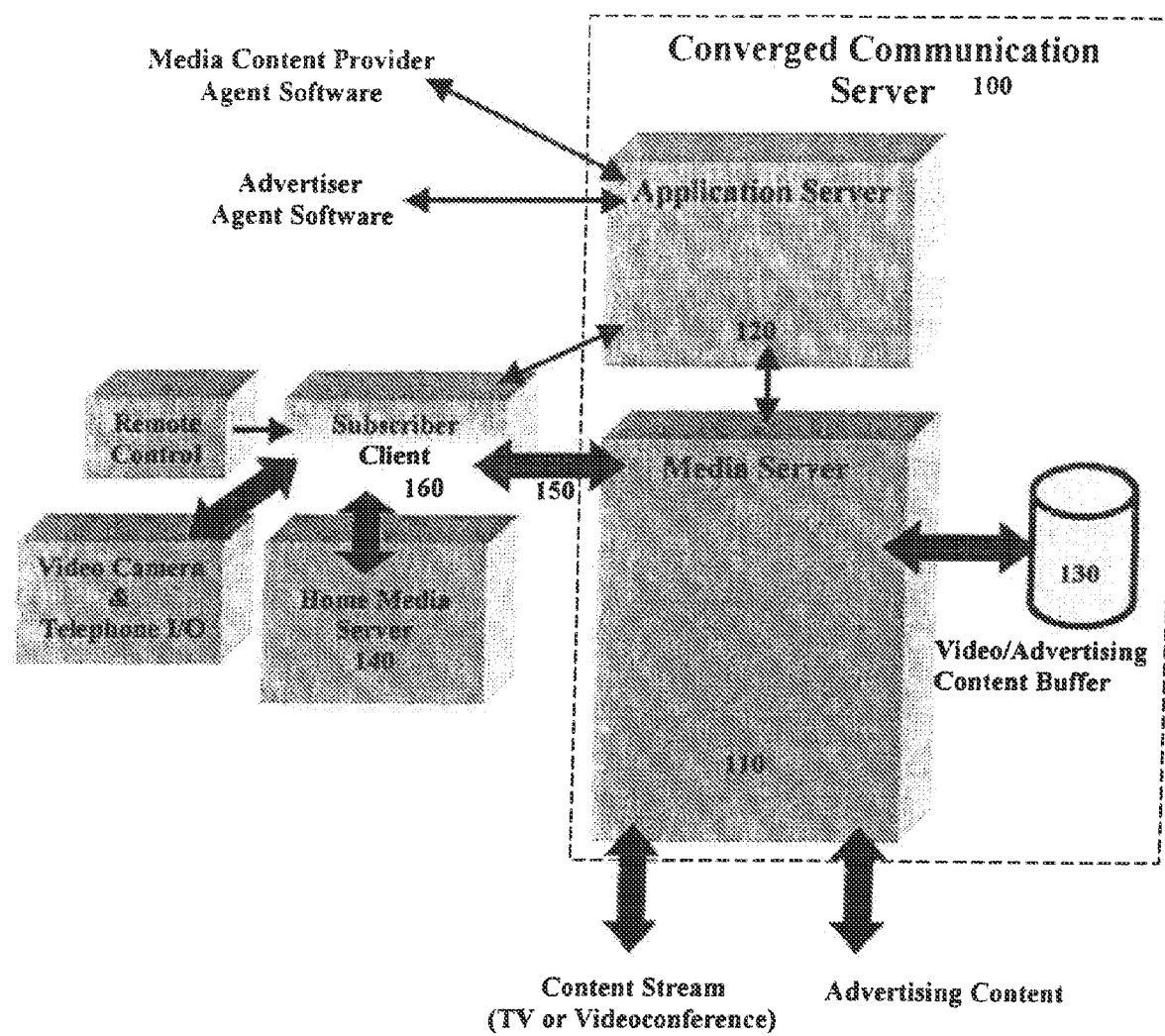
FIG. 1 illustrates a converged communication server with Transaction Management according to an embodiment of the present invention.

FIG. 1 illustrates a converged communication server (CCS) 100 with transaction management according to an embodiment of the present invention. The CCS 100 includes a Media Server 110, an Application Server 120, and a Video/Advertising Content Buffer 130.

A subscriber client 160 using a Home Media Server 140, transmits a request for content that he/she wishes to view along with his subscriber profile via a network 150, such as the Internet, to the CCS 100. The subscriber profile includes the subscriber's occupation, viewing preferences, and consumer preferences, as well as modeling other behavioral characteristics, such as content pricing goals, etc. The CCS 100 receives and routes the request to the Application Server 120. A Transaction Management Application contained within the Application Server 120, receives the subscriber request in the form of a command message containing the content selection and subscriber identification.

The Transaction Management Application includes software that provides several functions under the umbrella of transaction management. This software provides an execution environment through which software agents representing subscribers, advertisers, and content providers can interact. This interaction allows the agents to work together by exchanging and processing data. Negotiations between subscriber, advertiser, and content provider agents result in selecting ads and determining how and when they are integrated with the content.

The Media Server 110 contains a Content Processing Application and a Video Processing Application. These two applications working together process and integrate content and ads that are stored in a video/advertising content buffer 130, into a single stream of packetized data. This stream of integrated packetized data is then routed to the subscriber Home Media Server 140 via a packet network 150, such as the Internet.

Components of this invention include Media Server 110 and Application Server 120 hardware and software, as well as a subscriber client Home Media Server 140. Together, the components process and distribute content via a packet network 150 such as the Internet. These components are known to those in the art of content processing and distribution. Below are listed the components and their functions within the present invention.

Media Server Hardware

Media Server 110 hardware may include general-purpose processors, processor support chip sets, digital signal processors (DSP), and network processors. Special purpose system on a chip processors for processing video may also be included, Media Server Software Media Server 110 software includes software to route media content data packets between nodes, and software to perform content management, scheduling, and processing. Routing software is well known in the art. Content processing may take place in real-time or be pre-processed (if content is pre-stored in the media server). Content processing software may include functions that:

1. Decode multiple video streams (content and advertisement),
2. Processes these decoded streams in various ways (described below),
3. Integrates or composites the streams into a single stream (described below), and
4. Re-encodes the resultant stream into MPEG4, for example.

In addition, functions that process and integrate audio may also be included. Such functions may include:

1. Enhancement of audio with effects such as reverb or other well-known audio effects to increase attention to the audio (of product names, for example).
2. Mixing several sources of audio into a single output: for example, an audio ad voice-over during quiet passages.
3. Audio recognition and voice recognition.

To accomplish the above functions, the Media Server 110 in the present invention may include the following component software:

Content Router and Scheduler

Multiple content streams (main content+ads) are routed from their sources (remote media servers or local storage devices) to content processors (video processing applications) at the appropriate data rates and scheduled times.

Video Decoder/Encoder

Multiple video streams are decoded prior to processing and integration. Video decoder software, such as an MPEG4 decoder may be used to decode the multiple video streams. A video encoder, such as an MPEG4 encoder, may be used to re-encode a processed video stream.

Video Processor

The several video streams to be integrated (video content and ads) in this application may be processed with video image processing software independently. Examples of processing include:

1. Video fading—used for traditional interruption ads by fading to and from video black between content and ads. It may also be used to increase or reduce the brightness of images before compositing. Applications include the ability to overlay semi-transparent ads over streaming content. Overlay type ads are used in an embodiment described below.
2. Image recognition—used to identify components of an image for further processing or replacement. Recognition allows one image (a product for example) to be replaced by another. Certain ads may be specified to run while certain image components are on screen.
3. Image sizing—image components may be recognized and re-sized. For example, the main content images might be vertically squeezed to make room for another window containing an ad.
4. Image enhancement—product placements within movies and TV shows can be enhanced (brightened, highlighted, enlarged, color processed, etc.) to call greater attention to them.

Video Compositor/Integrator

Individual video streams processed as described above are combined together or composited into a single stream.

Audio Effects

Audio tracks may be enhanced through reverb, filtering, spatial processing, and other effects, to increase the attention viewers pay to audio details embedded within an audio track.

Audio Mixer

Audio from several sources, possibly enhanced as described above, may be mixed together to form a single mono or multi-channel source. The relative levels of the component audio sources may be modified at will in such a process. For example, this allows applications to control the relative volume of advertising audio to program audio, if ad audio and program audio are mixed.

The Converged Communication Server 100 also includes Application Server hardware and software.

Application Server Hardware

The Application Server 120 may be based on general-purpose processors, such as the Pentium, Xenon, etc., and may also include network processors such as Intel's XP-1200.

Application Server Software

The Application Server software provides several functions under the umbrella of transaction management. This software provides an execution environment through which software agents representing subscribers, advertisers, and content providers can interact. This interaction allows these agents to work together by exchanging data and processing this data.

In the embodiment discussed below, agents are embodied in traditional data structures and code representing information about the transaction participants and how they interact. The Transaction Management Application inputs information about the content, ads, and subscriber, and produces a list of ads that will be inserted into a video stream.

In an alternative embodiment, transaction agents are software programs that interact with other transaction agents as well as the execution environment. A subscriber agent might negotiate with many ad agents over several rounds to optimize the transaction from the perspective of all transaction participants. In addition, many subscriber agents might combine their bargaining power to obtain content at lower cost. Such interactions result in a commercial transaction session between subscriber, service provider, content provider and advertisers.

The transaction may specify advertiser and subscriber costs, ad selections, ad types, ad placements, ad screen positions, etc. In an alternative embodiment, the cost of the content may be offset by the cost of the ads, the fees charged by the service provider, or the cost to the subscriber, e.g., per movie or by monthly subscription with the service provider.

In an alternative embodiment, the types of ads may include any combination of traditional commercial interruption ads, banner ads, semi-transparent ads, synthetic product placement, and content-coupled ads (beer ads shown during bar scenes), etc.

In the preferred embodiment of the present invention, the Transaction Management Application facilitates negotiations between the subscriber, advertisers, and content provider agents. In this embodiment, only free content service is offered, i.e., the cost of content is always to be offset by ads. Negotiation involves finding the minimum number of ads, none of which are repeated, to cover the cost of the content. Ad rates may be a function of subscriber occupation. In a particular embodiment, all ads may be overlay ads, which will be mixed with video content in a fixed mixing ratio, allowing both content and ad video to be seen at the same time.

Each ad agent may include data that describe the ad rate, or how much the sponsor (subscriber) will pay per ad occurrence as a function of subscriber occupation. For all ads, this function may be represented as a lookup table, containing the rates for each ad for any given subscriber occupation ranked, for example, in order of descending rate. This array (representing all ad agents) is pre-stored in the Application Server 120. The Transaction Management Application may access columns of this array, based on the subscriber's occupation, and store them into an array (ad_rank_arry) for each transaction session.

Each subscriber agent may include data that describes the occupation of the subscriber. This information is stored as an integer index into a table of M possible occupation choices. The human subscriber has informed the application server at a previous time of his occupation index. All subscriber agents may be pre-stored in the Application Server 120.

Content agents include data describing the cost of the requested content (content_id_cost), and the duration of the requested content (content_id_length), in number of video frames. Content agents are pre-stored in the Application Server 120.

Ad content may be stored locally on a hard drive connected to the media server in a decoded uncompressed "raw" format. Program content may be located anywhere on network 150.

Figure 2:
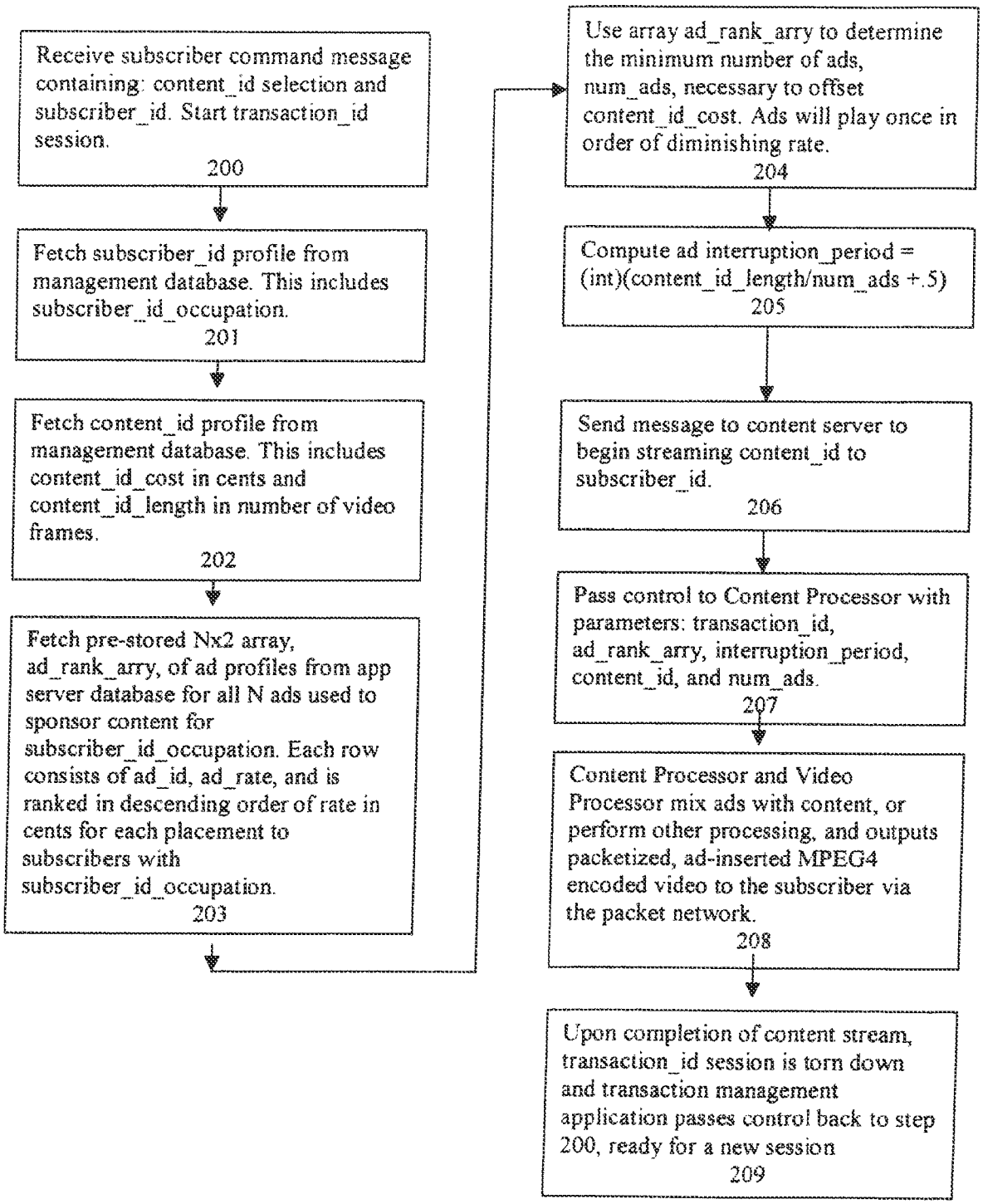
FIG. 2 illustrates a flow chart diagram of a method of providing a Transaction Management Application according to an embodiment of the present invention.

FIG. 2 illustrates a flow chart diagram of a method of providing a Transaction Management Application running on an Application Server according to an embodiment of the present invention. The Transaction Management Application (TMA) running on an Application Server 120 receives 200 from the Home Media Server 140 a subscriber command message containing content selection (content_id selection) and subscriber identification (subscribe_id).

The TMA starts 200 the transaction session (transaction_id session). The TMA retrieves 201 the subscriber profile (subsciber_id profile) from a management database. This includes subscriber occupation (subscriber_id_occupation). The TMA then retrieves 202 content profile (content_id profile) from the management database. This information includes the content cost (content_id_cost), in cents, and the content length (content_id_length), in number of video frames.

The TMA next retrieves 203 a pre-stored N×2 array (ad_rank_arry) (N rows by two columns), of ad profiles from the Application Server database for all N ads used to sponsor content for subscriber occupation (subscriber_id_occupation). Each row of the array consists of ad identification (ad_id), ad rate (ad_rate), and is ranked, for example, in descending order of rate in cents for each placement to subscribers with a particular subscriber occupation. Ad identification identifies the type and selection of ad, and ad rate equals the cost of that ad in cents.

The TMA uses the N×2 array (ad_rank_arry) to determine 204 the minimum number of ads (num_ads), necessary to offset the content cost, content_id_cost. Ads may play once in order of diminishing rate. The TMA computes 205 the length of time between the start of each ad (ad interruption_period), where an ad interruption period equals the integer value of the content length divided by the number of ads plus 0.5:

$$\text{ad interruption\_period} = (\text{int})(\text{content\_id\_length}/\text{num\_ads} + 0.5)$$

For example, assume the content cost (content_id_cost) is $1.00, consider an N×2 array of ads as follows:

Ad1, 0.25$
Ad2, 0.25$
Ad3, 0.20$
Ad4, 0.15$
Ad5, 0.10$
Ad6, 0.05$
Ad7, 0.05$

The minimum number of ads (num_ads), necessary to offset the content cost, content_id_cost is six (sum of Ad1-

Ad6 equals $1.00). The seventh ad will not be used. The ads will play once in order of diminishing rate, i.e., Ad1 followed by Ad2 followed by Ad3, etc.

Next, calculate the length of time between the start of each ad (ad interruption_period), where an ad interruption period equals the integer value of the content length divided by the number of ads (six in our example) plus 0.5. Assume content length equals two hundred frames:

$$\text{ad interruption\_period}=(int)(200/6+0.5)=33$$

Therefore, Ad1 will play starting on frame 0 of the content, Ad2 will play starting on frame 33, Ad3 will play starting on frame 66, Ad4 will play starting, on frame 99, etc.

The TMA sends a message 206 to the content server to begin streaming the content selected by the subscriber, content_id, to the subscriber. Control is then passed 207 from the TMA to a Content Processing Application (CPA) along with parameters transaction transaction_id, ad_rank_any, interruption_period, content_id, and num_ads.

A CPA and a Video Processing Application (VPA) mix 208 ads with content, or perform other processing, and the CPA and VPA distribute a packetized, ad-inserted MPEG4 encoded composite video stream to the subscriber via the packet network.

Upon distribution of the composite video stream, the transaction session (transaction_id session) is complete 209 and the TMA passes control back to step 200, ready to begin a new session.

Figure 3:
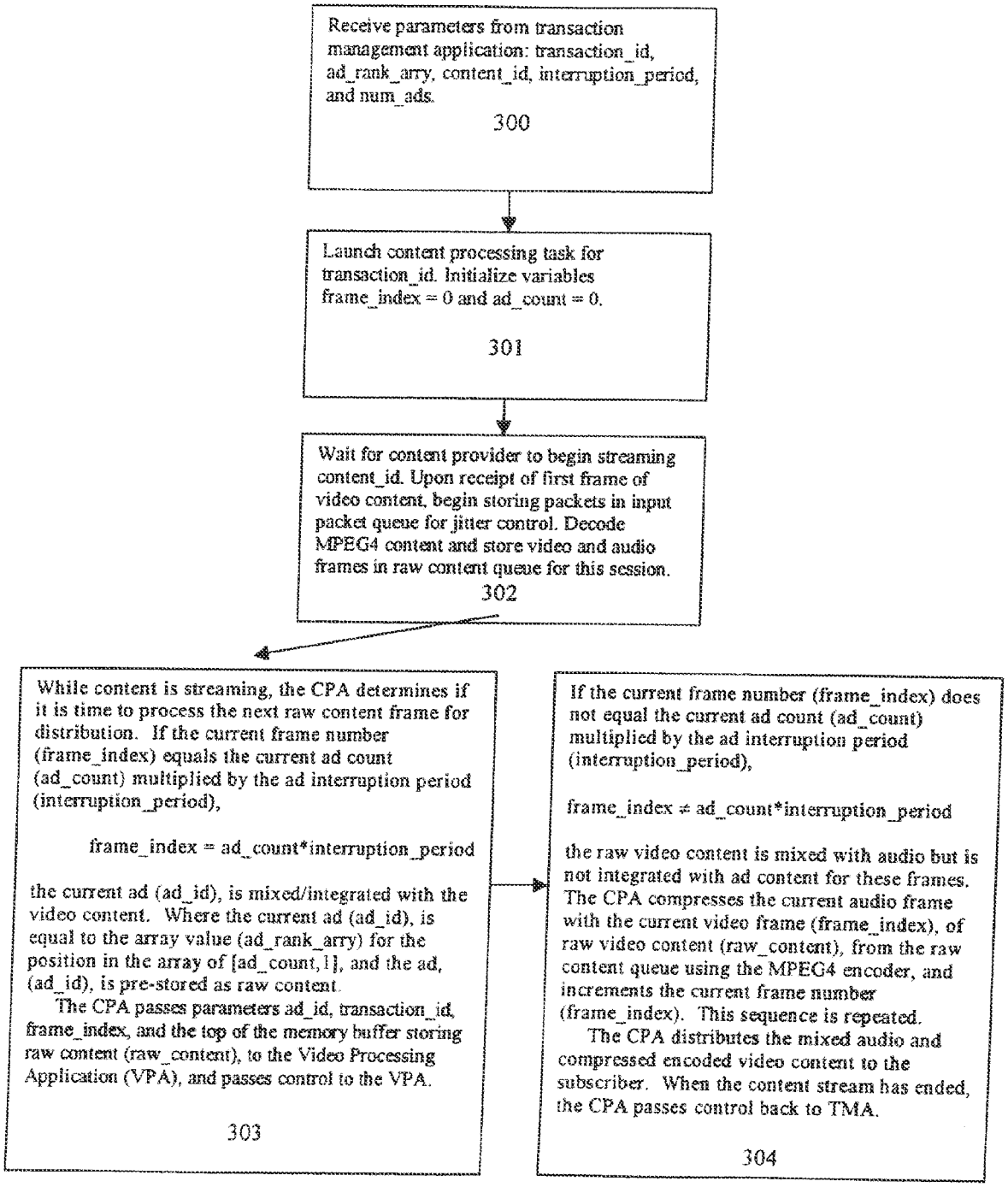
FIG. 3 illustrates a flow chart diagram of a method of providing a Content Processing Application according to an embodiment of the present invention.

FIG. 3 illustrates a flow chart diagram of a method of providing a Content Processing Application running on a Media Server according to an embodiment of the present invention. The CPA receives 300 parameters from the TMA, transaction_id, ad_rank_arry, content_id, interruption_period, and num_ads. The CPA launches 301 a new content processing task for transaction session (transaction_id), and initializes counter variables 301 for current frame number (frame_index) and current ad count (ad_count) to zero values, i.e., frame_index=0, ad_count=0. The value of frame_index is incremented after each frame of content is mixed with each frame of the ad. The value of ad_count is incremented after each entire ad has been mixed with content.

The CPA waits for the content provider to begin streaming content (content_id). Upon receipt of the first frame of video content, the CPA begins storing 302 MPEG4 encoded content in an input packet queue for jitter control. The CPA decodes the MPEG4 content from the input packet queue and stores decoded video and audio frames in a raw content queue for this session. Decoded raw video (raw_content_q) is stored frame by frame, and is retrieved frame by frame for processing based on the current frame number (frame_index). Ad content (ad_id), is pre-stored locally on a hard drive connected to the Media Server 110 in a decoded uncompressed "raw" format.

While content is streaming, the CPA determines if it is time to process 303 the next raw content frame for distribution. If the current frame number (frame_index) equals the current ad count (ad_count) multiplied by the ad interruption period (interrupt_period), $$\text{frame\_index}=\text{ad\_count}*\text{interruption\_period}$$

the current ad (ad_id), is mixed/integrated with the video content. Where the current ad (ad_id), is equal to the array value (ad_rank_arry) for the position in the array of [ad_count,1], and the ad (ad_id), is pre-stored as raw content.

The CPA passes 303 parameters ad_id, transaction_id, frame_index, and the top of the memory buffer storing raw content, raw_content_q, to the Video Processing Application (VPA), and passes control to the Video Processing Application.

The video processor mixes audio and integrates the raw video content, raw_content, with the ad, ad_id, starting with the frames having the current value of frame_index. The video processor mixes both video and audio content with the ad on a frame by frame basis to form a composite video stream. The current frame number (frame_index) is incremented after each frame is mixed.

The VPA compresses and encodes the composite video stream using a MPEG4 encoder, and distributes the encoded composite video stream to the subscriber. When the last frame of the ad (ad_id), has been integrated with the video content, the VPA returns the value of frame_index to the CPA. The CPA increments current ad counter (ad_count) so that the next ad (ad_id) can be integrated.

If the current frame number (frame_index) does not equal the current ad count (ad_count) multiplied by the ad interruption period (interruption_period), $$\text{frame\_index}\neq\text{ad\_count}*\text{interruption\_period}$$

the raw video content is mixed with audio 304 but is not integrated with ad content for these frames. The CPA compresses the current audio frame with the current video frame, frame_index, of raw video content (raw_content), from the raw content queue using the MPEG4 encoder, and increments the current frame number (frame_index). This sequence is repeated for the incremented current frame number (frame_index) not equal to the current ad count (ad_id) multiplied by the ad interruption period (interruption_period), $$\text{frame\_index}\neq\text{ad\_count}*\text{interruption\_period}$$

The CPA distributes 304 the mixed audio and compressed encoded video content to the subscriber. When the content stream has ended, the CPA passes control back to TMA.

Figure 4:
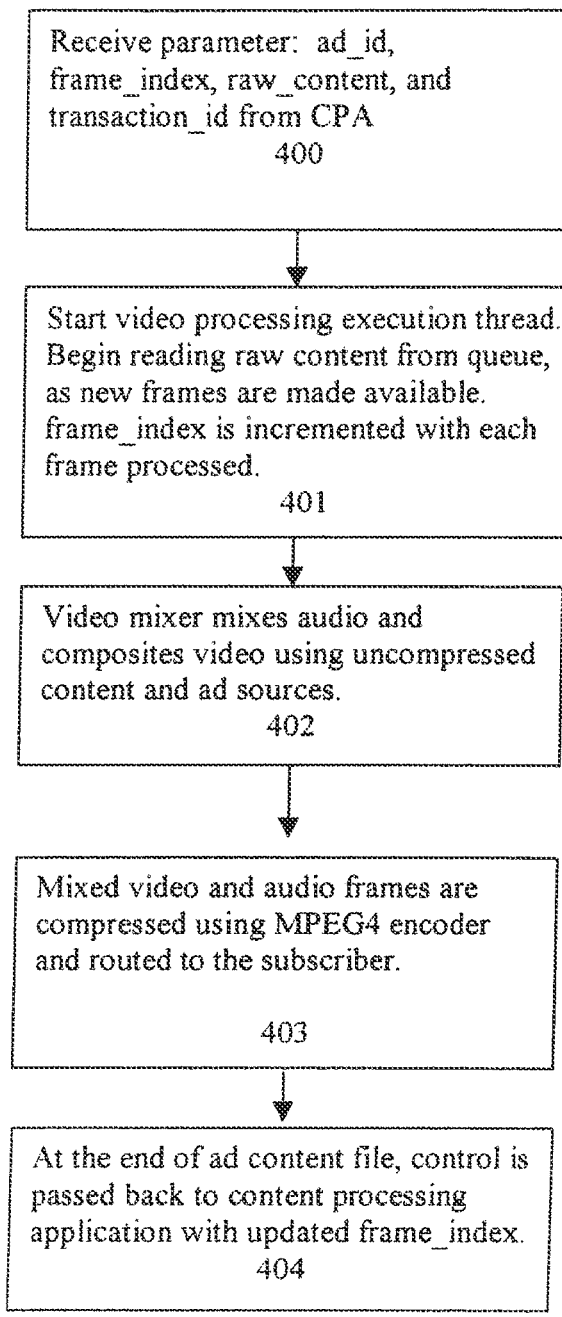
FIG. 4 illustrates a flow chart diagram of a method of providing a Video Processing Application according to an embodiment of the present invention.

FIG. 4 illustrates a flow chart diagram of a method for providing a Video Processing Application running on a Media Server according to an embodiment of the present invention. The VPA receives 400 parameters, ad_id, frame_index, raw_content, and transaction_id from the CPA.

As discussed above, the VPA starts the video processing execution thread 401. The VPA begins reading raw content (raw_content) from raw content queue, beginning with the value of current frame number (frame_index) passed from the CPA. The current frame number (frame_index) is incremented with each frame processed. The video processor mixes 402 audio and integrates video using uncompressed raw content (raw_content), and the current ad (ad_id), to form the composite video stream.

The mixed composite video and audio frames are compressed 403 using the MPEG4 encoder and distributed to the subscriber. At the end of ad content file, control is passed back 404 to Content Processing Application with updated current frame number (frame_index).

While the description above refers to particular embodiments, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A converged communication server, comprising:
    an Application Server having a Transaction Management Application to perform transaction management;
    a buffer to store streams of video data packets and advertising data packets;
    a Media Server having a software application to perform integration of the streams of video data packets and advertising data packets, and to distribute a stream of integrated video and advertising data packets to a subscriber, wherein the transaction management application determines a minimum number of ads to be integrated into the streams of video data packets based on video content cost as identified in a content profile.

2. The converged communication server according to claim 1, wherein the Transaction Management Application receives a subscriber command message containing a content selection and a subscriber identification from the subscriber.

3. The converged communication server according to claim 1, wherein the Transaction Management Application includes a transaction software agent for each of the subscriber, an advertiser, and a content provider, the transaction software agent for each of the subscriber, the advertiser, and the content provider, transact by exchanging data and processing data.

4. The converged communication server according to claim 3, wherein the transaction software agent for each of the subscriber, the advertiser, and the content provider include data structures and code representing information about the subscriber, the advertiser, and the content provider.

5. The converged communication server according to claim 1, wherein the software application includes a Content Processing Application and a Video Processing Application 6. A converged communication server and transaction management system, comprising:
    an Application Server having a Transaction Management Application to perform transaction management;
    a Media Server having a Content Processing Application and a Video Processing Application to perform processing and integration of streams of video data packets and advertising data packets;
    a buffer to store the video data packets and the advertising data packets;
    a network to distribute a stream of integrated video and advertising data packets to a Home Media Server, wherein the Home Media Server receives the stream of integrated video and advertising data packets from the Media Server, and plays the stream of integrated video and advertising data packets on an video device, wherein the transaction management application determines a minimum number of ads to be integrated into the streams of video data packets based on video content cost as identified in a content profile.

7. The converged communication server and transaction management system according to claim 6, wherein the Transaction Management Application receives a subscriber command message containing a content selection and a subscriber identification from the Home Media Server.

8. The converged communication server and transaction management system according to claim 6, wherein the Transaction Management Application includes a transaction software agent for each of a subscriber, an advertiser, and a content provider, the transaction software agent for each of the subscriber, the advertiser, and the content provider, transact by exchanging data and processing data.

9. The converged communication server and transaction management system according to claim 8, wherein the transaction software agent for each of the subscriber, the advertiser, and the content provider include data structures and code representing information about the subscriber, the advertiser, and the content provider.

10. A converged communication server, comprising:
    an Application Server having a Transaction Management Application (TMA) to perform transaction management, the TMA receiving a content selection and subscriber information;
    a buffer to store streams of advertising data packets;
    a Media Server having a Content Processing Application to receive encoded video data packets, decode the received video data packets and store the received decoded video data packets in the buffer, and a Video Processing Application, when ad integration conditions are met, to 1) mix decoded advertising data packets with the received decoded video data packets to generate a stream of integrated video data and advertising data packets when a, 2) compress and encode the stream of integrated video data packets and advertising data packets and 3) distribute the encoded stream of integrated video data packets and advertising data packets to a subscriber, wherein the transaction management application determines a minimum number of ads to be integrated into the streams of video data packets based on content cost of the content selection as identified in a content profile.

11. The converged communication server of claim 10, wherein the Content Processing Application also receives encoded audio data packets, decodes the received audio data packets and stores the received decoded audio data packets in the buffer,
    and the Video Processing Application 1) integrates the decoded advertising data packets with the received decoded video data packets and the received decoded audio data packets to generate a stream of integrated video data packets, audio data packets, and advertising data packets, 2) compresses and encodes the stream of integrated video data packets, audio data packets and advertising data packets and 3) distributes the encoded stream of integrated video data packets, audio data packets and advertising data packets to the subscriber.

12. The converged communication server of claim 10, wherein the Video Processing Application, when ad integration conditions are not met, compresses and encodes the stream of received video data packets and distributes the encoded stream of video data packets to the subscriber.

13. The converged communication server of claim 12, wherein the Content Processing Application also receives encoded audio data packets, decodes the received audio data packets and stores the received decoded audio data packets in the buffer,
    and the Video Processing Application compresses and encodes the stream of integrated video data packets and audio data packets and 3) distributes the encoded stream of integrated video data packets and audio data packets to the subscriber.

* * * * *